United States Patent [19]
Watts

[11] Patent Number: 5,427,418
[45] Date of Patent: Jun. 27, 1995

[54] HIGH STRENGTH, LOW TORQUE THREADED TUBULAR CONNECTION

[76] Inventor: John D. Watts, P.O. Box 79466, Houston, Tex. 77279-9466

[21] Appl. No.: 992,164

[22] Filed: Dec. 17, 1992

Related U.S. Application Data

[63] Continuation-in-part of Ser. No. 855,850, Mar. 20, 1992, which is a continuation-in-part of Ser. No. 705,328, May 24, 1991, Pat. No. 5,143,411, which is a continuation-in-part of Ser. No. 315,271, Feb. 24, 1989, Pat. No. 5,018,771, which is a continuation-in-part of Ser. No. 897,069, Jul. 18, 1986, Pat. No. 4,813,717.

[51] Int. Cl.⁶ .................................................. F16L 7/02
[52] U.S. Cl. ..................................... 285/94; 285/333; 285/334
[58] Field of Search ................. 285/333, 334, 355, 390

[56] References Cited

U.S. PATENT DOCUMENTS

| | | | |
|---|---|---|---|
| 597,000 | 1/1898 | Higbee | 285/333 |
| 929,027 | 7/1909 | Schuhmann | 285/333 |
| 2,183,644 | 12/1939 | Frame | 285/333 |
| 2,909,380 | 10/1959 | Hoye et al. | 285/333 |
| 2,992,613 | 7/1961 | Bodine | 285/333 X |
| 3,346,278 | 10/1967 | Yocum | 285/333 |
| 3,658,368 | 4/1972 | Hokanson | 285/333 |
| 4,004,832 | 1/1977 | Connelly | 285/333 |

*Primary Examiner*—Dave W. Arola

[57] ABSTRACT

A threaded pipe connection as shown in FIGS. 1, 4, 5, 6 or 7, having a thread form such as depicted in FIGS. 8–11, that has: improved sealing; increased resistance to mechanical loads; easy assembly and low makeup torque. Both pin (31) and box (45) may be cut on non-upset pipe ends and result in nearly 100 percent joint efficiency. Tension flank (33) and compression flank (34) may be formed on pin (31) at high flank angles measured from the tubular axis so as to withstand high axial loads without forcing the pin inwardly and the box outwardly, which would tend to separate the mating threads, break the seal and jump threads. Low torque is assured by the complementary forms of pin threads (32) and box threads (42) which confine the thread dope (49) to remain in the root gaps (52) and (54) during assembly.

19 Claims, 4 Drawing Sheets

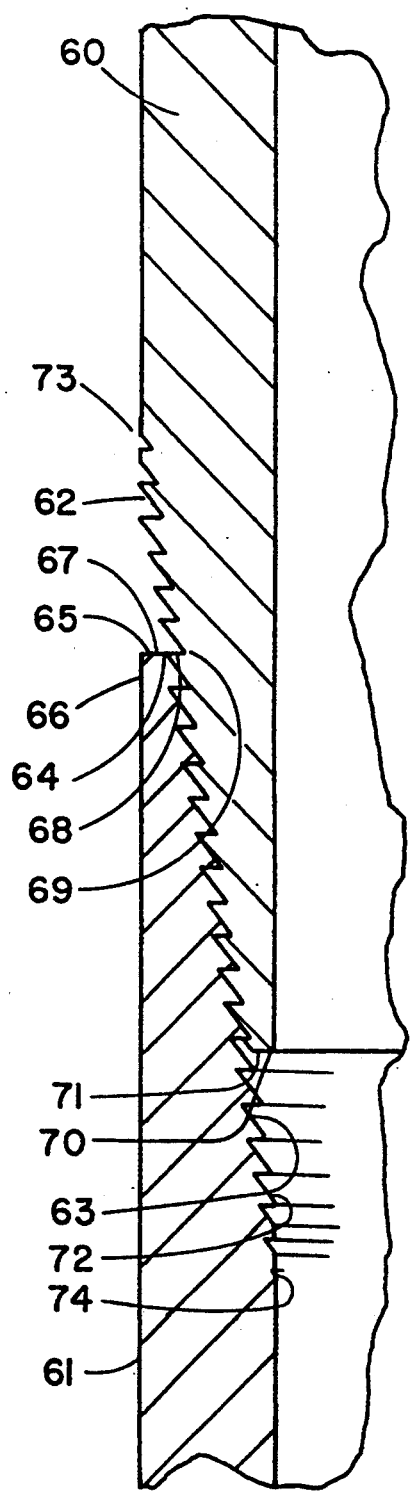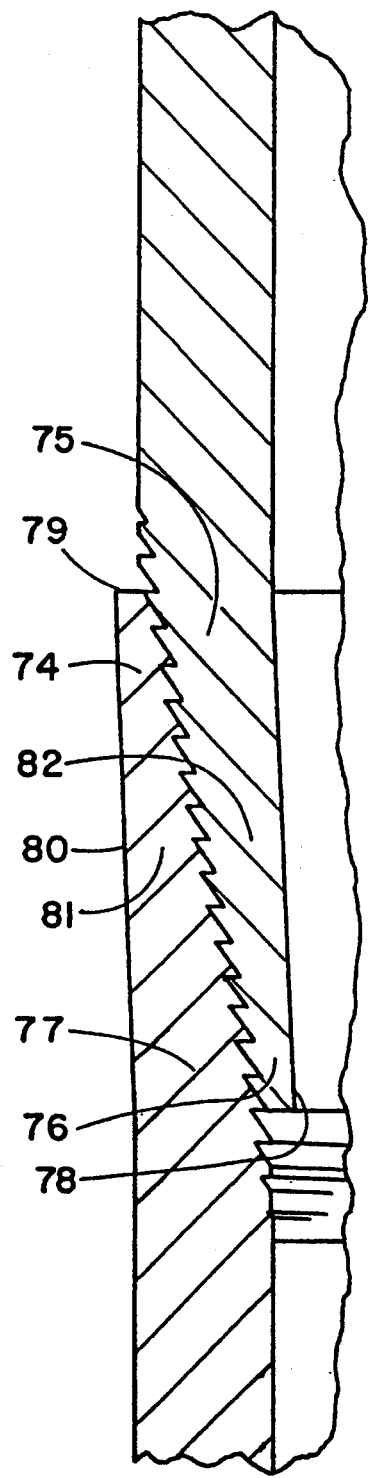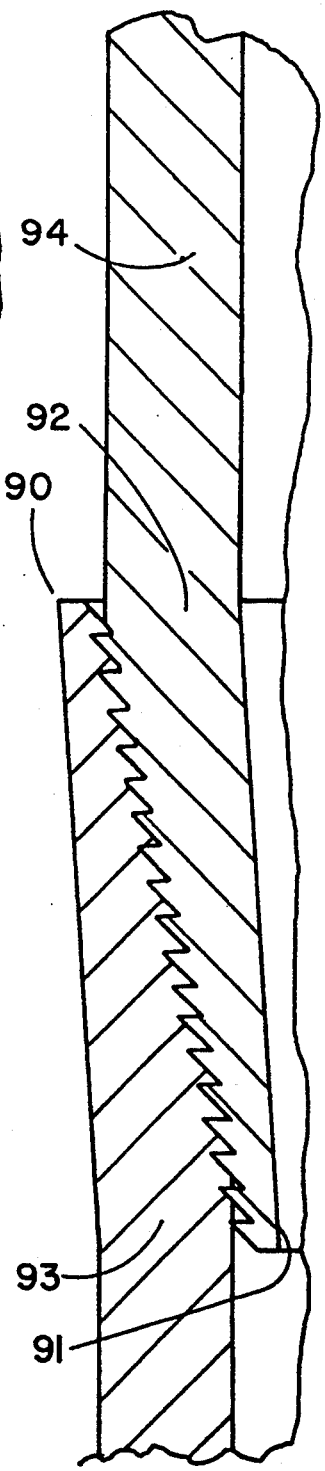

HIGH STRENGTH, LOW TORQUE THREADED TUBULAR CONNECTION

This application is a continuation-in-part of prior application Ser. No. 855,850 filed Mar. 20, 1992 which is a C-I-P of prior application Ser. No. 705,328 filed May 24, 1991 which issued as U.S. Pat. No. 5,143,411 which was a C-I-P of application Ser. No. 315,271 filed Feb. 24, 1989 and which issued as U.S. Pat. No. 5,018,771 which is a continuation-in-part of application Ser. No. 897,069 filed Jul. 18, 1986 and issued as U.S. Pat. No. 4,813,717, which was a continuation of PCT/US85/02600 filed Feb. 19, 1985 now abandonded, which was a continuation of PCT/US84/19360 filed Nov. 23, 1984, now abandoned.

TECHNICAL FIELD

The outer diameters of conventional threaded pipe couplings are substantially greater than the outer diameter of the pipe joints that they connect and the same is true for most strings of casing and tubing installed within oilwells, however, several constraints are presented by oilwells that are not normally present in surface piping systems. Each consecutive string including couplings, must pass within a hole bore diameter established by a drill or by a previously set string of pipe. Additionally, there must be sufficient clearance between that bore and the maximum diameter of the string being run so as to lower freely without sticking and to allow sufficient flow area through the annulus then formed for fluids, without causing an unacceptable pressure drop caused by friction of the flowing fluid. Thirdly, oilwell strings must withstand axial tension and compression loads caused by the weight of miles of pipe that may be hanging within the well. Further, oilwell strings may be subject to external fluid pressures being greater than internal pressures to thereby introduce tendency to collapse. For these and other reasons, joints with upset ends and high cost "premium connections" have been introduced to work in the presence of such constraints. However, such solutions result with the outer diameters of connections being greater than the outside diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints, such as Hycril FJ Premium tubing connections enjoy only 43% axial tension strength as compared to the unthreaded pipe wall, about the same as non-upset API tubing connections. Presently, due to diameter constraints, a typical oilwell pipe program may be: 5½ OD×2⅜ OD×1.6 OD To be far more advantageous, a 2⅞ OD×1.6 OD×1.05 OD can often make an installation possible due to clearance or cost reasons that the typical program above could not, and in every case, a less expensive and a more efficient installation should result. Many tons of steel per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without the axial stress exceeding the circumferential stress. Reduction of the pipe wall thickness as by a thread formed on a joint of non-upset pipe, will therefore reduce still further, the magnitude of axial stress that may be dedicated to support the pipe weight. There is therefore a substantial need for a non-upset, integral tubular connection having a higher efficiency with no loss of the connections ability to seal against fluid pressure.

For assembly of conventional threaded connections, the external thread must be carefully aligned both axially and angularly, with the internal thread before stabbing so as to prevent cross-threading of the connection. It is then moved axially to contact the end thread of the pin with a thread of the box to thereby effect stab position. The length of the pin thread that then projects into the box if any, is known as stab depth. Then, while being careful to maintain said alignment, the pin is rotated into the box by hand to a "hand-tight" position after which, a wrench is used to tighten the pin to a position of full makeup. The Accuracy of stabbing often determines the effect of the connection. Connections that have been cross-threaded usually leak even after a proper makeup. Connections that are put into service in a cros-threaded condition will not only leak but will rupture at a small fraction of the rated load. It is therefore clear that a connection designed to prevent crosthreading is highly desirable to eliminate the danger and damage that can be caused by such leakage and rupture.

An upset pipe end is generally understood by the industry as being a pipe end that has been heated to a temperature above the lower critical temperature for the pipe metal and then formed under great pressure so as to gather axially, metal of the pipe wall and thereby increase substantially, the cross-section area of the pipe wall at that end of the pipe. After upsetting the end of a high strength pipe, API Specifications require that the entire joint of pipe be quenched and tempered, all of which can greatly increase the cost of a joint of pipe.

In an effort to improve the radial clearance and cost of a tubular connection and still retain significant strength, "near-flush" connections were introduced which comprise "swaged" pipe ends. Swaged pipe ends are formed at temperatures below the lower critical temperature, by moderate radial pressures that increase or decrease the mean pipe diameter of the swaged zone, but do not substantially change the cross section area thereof. The swaged end of a high strength pipe need only be stress relieved at a temperature below the lower critical temperature, which is far less costly than a quench and temper. A pipe end may be "swaged-in" to a smaller diameter to receive an external thread or it may be "swaged-out" to a larger diameter to receive an internal thread. Generally, the outermost diameter of swaged-out ends is less than an API Coupling O.D. but more than pipe body O.D.

A typical family of swaged pipe connections having efficiencies of 65% may seem to be adequate to an engineer while designing a well, if calculations indicate that pipe weight and fluid pressure will generate loads on the connections of only 50% of pipe strength. However, many factors deep in the earth can cause unexpected rupture of a connection, endangering both people and the environment, when well designs are based on pipe stress. For example: 0.19% strain will yield the body of API J55 pipe; 0.28% will yield N80; 0.38% will yield P110. If a high efficiency connection allows the strain of the pipe body to continue, it will usually accept 5% or more strain before rupture. However, if the parting load of a casing connection is less than the load to yield the pipe body, then the connection will part before strain reaches the low limits given above. Strains over 1% are often imposed on the casing of wells that produce from or near, over-pressured and under compacted reservoirs, of which there are many. If a connection parting load exceeds slightly, the load that will yield the pipe body, then the casing string will accept strains several times greater than if connection parting load is slightly below the pipe body yield load. To safely meet strain criteria for well design, connection efficiency should exceed the value=100×(pipe yield strength/pipe ultimate strength). Accordingly, casing connection strengths should exceed by some reasonable margin, the following % efficiencies: 73% for J55; 80% for N80 and P110 API Pipe Grades.

Although most non-upset threaded pipe connections have compressive axial strengths in the range of 50% as compared to the pipe body strength, there are needs for plain-end threaded pipe connections having much higher strengths. One such need is for joints of "Drive-Pipe" in pipe sizes of 60" and larger, that are hammered into the earth successively after connection with a previous joint driven, to form long strings of pipe driven into the earth. The API8Rd Connection cannot be used for drive-pipe because easy stabbing, low makeup torque and structural rigidity is imperative for such joints. Drive-pipe strings are used as "piling" to support the weight of other structures and are also used as the first string in a deep well. To efficiently and reliably transmit extremely heavy blows from massive hammers, the threaded connection must not allow relative motion between the box and pin members of the connection so as to prevent loosening, leaking, wear and/or compressive failure. The API Buttress connection is not used for such service because it allows end-play between box and pin which dissipates the hammers impact and allows leakage of the connection. Such connections must also have high strength in tension so as to withstand high bending loads and it must seal against fluid pressure after being driven. Flush-joint drive-pipe connections offer less ground resistance than collar-type or weld-on connections while being driven and they cost much less however, the best flush-joints available for Drive-Pipe have only 60% efficiency and are very difficult to stab. When higher strength drive-pipe connections are needed, the user must now use a weld-on type. Both types seal on rubber which reduces the connections service life.

Therefore, a threaded pipe connection for large pipe sizes is needed that:is cost effective; has high axial strength; stabs easily; makes up with low torque; provides a reliable permanent seal against dangerous fluids; resists handling damage; does not leak or loosen after being driven into the earth.

BACKGROUND ART

A flush joint tubular connection has inner and outer diameters substantially the same as the tubing joints which the connection connects. A flush joint tubular connection made be the Hydril Company and covered by numerous patents comprise a first straight thread, a second straight thread of sufficient diameter to pass within the bore of the first thread and a tapered mating seat between the two joints of tubing which is a premium joint of high cost and according to published data, enjoys only 42% axial strength, relative to the pipe wall.

Standard A.P.I. non-upset tubing connections comprise couplings having outer diameters considerably larger than the pipe outer diameter but still only enjoy approximately 42% efficiency as above. A.P.I. does list a "turned down" collar outer diameter to increase clearance between strings, however, the "turned down" diameter still exceeds substantially, the pipe outer diameter.

No prior art discloses a flush joint tubular connection having tapered threads, that when properly assembled, effects optimum stresses within the small end of the external thread and within the large end of the internal thread so as to provide a connection of maximum efficiency. Conventional pipe connections have threads with like tapers and result in a constant diametrical interference along the taper between the external and internal threads, thereby causing excessive stresses or requiring increased wall thickness at the end of the pipe. Excessive stresses reduce the joint strength and an increased wall thickness rules out a flush joint connection.

It is therefore clear that a flush joint connection having a high efficiency as provided by the instant invention is needed for use within oilwells and other pipe assemblies wherein radial clearance is limited.

Standard pipe threads as well as A.P.I. threaded connections have such a tendency to cross-thread that "stabbing guides" are often used at a considerable cost of time and expense. Such threads have an extremely shallow stab depth and a relatively large thread depth, both of which add to the cross-thread problem. Perfect alignment is difficult to attain under normal field conditions and often impossible to attain under difficult conditions. Premium connections such as disclosed by Stone in U.S. Pat. No. 1,932,427 require even closer alignment to stab because of the close fit of straight threads and the "pin-nose" seal 32, which is highly susceptible to damage. To applicants belief no prior art comprised the combination of a deep stab, thread height and thread diameter as required to provide a tapered threaded connection that will stab easily and quickly without the possibility of cross-threading. By way of an example, a 2⅜ EU 8rd A.P.I. tubing thread has a 2.473" pin end diameter and a 2.437" box bore at the first thread which allows no entry of the pin into the box at stab position. The counterbore of the box allows entry of the pin only 0.446" affording at best, axial alignment but no angular alignment so less than six degrees of angular misalignment will allow it to cross-thread.

About 1940, A.P.I. changed from 10V threads to 8rd and a substantial improvement resulted because less gauling occurred during makeup of the threads. It was then commonly assumed "that any thread finer than 8 threads per inch would gall and cross-thread" and that myth persists today. However, the improvement resulted almost entirely from the better thread form, eliminating the sharp edge V threads. The present invention with threads as fine as 20 per inch, run fast and smooth without cross-threading, and it has other features as well.

Conventional "near-flush" connections mentioned above, have two-step straight box threads formed within swaged-out ends and pin threads formed on swaged-in ends. Such swaged ends comprise a single tapered zone extending axially from the pipe body of original pipe diameters having a mean conical angle of taper of approximately two degrees. Typically, such swaged connections are rated by their suppliers as having from 50% to 75% efficiency depending on wall thickness, and with a variety of fluid pressure ratings. Such a swaged connection when compared to a 42% conventional flush joint connection, has improved strength, but at the expense of clearance.

To applicants best knowledge and belief, all such swaged connections now on the market are swaged to form only the degree of taper that approximates the lay of threads to be formed thereto. Typically, before a thread is machined in the tapered zone, a clean-up cut is made to assure there being enough metal to fully form the threads. Unfortunately, such a cut reduces the cross-section area of the tapered zone which limits connection efficiency. Additionally, production machining allows for only approximate axial positioning of the pipe in the machine prior to gripping the pipe in the chuck and such approximation can cause further thinning of the tapered zone. Thirdly, if first measurement of a freshly cut thread indicates that a thread recut is required, then the swage must be cut off and the end reswaged before even a 75% thread could be cut at that end. Therefore, in addition to the basic disadvantages of a two-step thread having a pin-nose seal, it is now even more clear why suppliers of pipe threads that are formed on swaged ends cannot provide a family of pipe connections with efficiencies greater than 75%.

Applicants U.S. Pat. No. 4,813,717 which is in the line of priority for the present application, discloses a connection with selective efficiency between 75% and 100% for non-upset pipe using a coupling in one embodiment per claims 1–17 and an integral connection in another embodiment per claims 18–19. The present invention is complimentary to said patent and teaches configurations for connections having swaged ends. To applicants best knowledge and belief, no non-upset integral connection is currently available that will meet the strain design criteria above. For users who prefer integral non-upset pipe connections, there is clearly a need for one with an efficiency sufficient to meet the strain design criteria defined above.

For purposes of this application, I define as follows: "Pin" is an externally threaded portion of a tubular member; "Box" is an internally threaded portion of a connecting member; "Flank angle" is the angle measured between a thread flank profile and the tubular axis; "Included angle" is the angle measured between the flanks, in the space between the flank surfaces; "Dope" is a pipe thread compound such as specified in API 5A2 that has been developed for 8Rd threads over many years to have an optimum combination of selected greases mixed with solid particles of specific dimension and nature so as to provide most desirable characteristics for sealing, lubricating and brushing over a substantial range of service temperatures and pressures. "Gap" is a distance that may exist between mating thread surfaces when they are positioned in best mating contact with each other, the distance being measured perpendicular to the surfaces.

The pipe thread form most widely used is the old "sharp-V" having 60 degree included angle as specified in ANSI B2.1 for AMERICAN NATIONAL STANDARD TAPER PIPE THREADS and in API 5B Table 2.8 for API LINE-PIPE THREADS. Although ANSI B2.1 shows thread sizes up to 24" and API 5B shows thread sizes up to 20", sizes above 4½" are seldom used because their high makeup torque makes field assembly impractical; such threads are very prone to handling damage; they frequently leak, loosen or break and are difficult to stab. Sharp-V threads are restricted to very low pressure services by government and industry codes such as API & ASME, who require the use of other connections such as flanged or welded, when dangerous fluids are to be contained. In addition to problems cited above, sharp-V threads often tear and gall during makeup which can cause excessive torque and worse, such as dangerous and costly leakage of fluid from within the pipe at some unpredictable time in the future. In an effort to solve such problems and because there is no reasonable alternative to the use of threaded pipe connections for downhole use in oil and gas wells, API adopted about 1940, the "8-Round" form shown in API 5B Table 2.9 which has 8 threads per inch and an included angle of 60 degrees, the flanks being connected by rounded roots and crests formed with a radii 0.017" and 0.020" respectively. Although thread tearing and galling were greatly reduced, the retained 60 degree included angle still allowed axial and bending loads to cause loosening, leakage and then pullout of a connection. For many 8Rd connections, pullout determines the parting load and leaks occur at much lesser loads. The 8 Rd thread form, without regard to pipe strength, is limited to only 5,000 psi service by API 5A due to such weaknesses. Both sharp-V and 8 Rd form standards specify intentional mismatches between crests and roots of mating threads like all other conventional threads known to applicant, which in turn, acts to increase the root gaps, which within tolerances, ranges from 0.005" to 0.011" for sharp-V and from 0.003" to 0.008" for 8Rd even after the mating flanks are wedged together at full makeup, which allows dope to leak through the root gap. As makeup begins, the root gap substantially equals the flank gaps, as dictated by the 60 degree included angle whereupon, solid particles in the dope extrude helically from between mating flanks and out of the connection as easily as it flows from the root gap. Thus, flanks wedge against each other with virtually no solid lubrication retained between them, which greatly increases galling tendency. The coefficient of friction with just grease is 0.084, vs 0.021 with the solid lubricants, which can increase torque by a factor of four. It is now clear how the root-gap/flank-gap ratio can affect torque.

To reduce thread pullout, API adopted many years ago, the "BUTTRESS THREAD FORM" depicted in API 5B FIGS. 2.5 & 2.6 for use on casing strings. The 87 degree tension flank angle greatly reduced tendency of pullout and an 80 degree compression flank angle reduced to a lesser extent, tendency for axial loads to jump the pin into or out of the box. However, such improvements were traded for a loss of sealing ability, a loss of rigidity and a cost increase as compared to API 8Rd threads. The Buttress form has many more dimensions to control than the 8Rd form which in turn, increases tolerance stack-up and results in flank gaps of 0.002" to 0.008". Even if a low pressure seal is formed on makeup, external loads imposed on such a connection cause end play between the mating flanks which extrudes Dope to cause loosening and leakage of the connection, particularly after the dope has had time to dry. Such end-play was felt necessary by the industry experts on API Committee 5B to prevent extreme torque and galling if "wedging" between the 13 degree included angle was allowed however, not obvious to them were the ill effects on connection rigidity and sealability that they incurred by the change. As a result, when critical jobs require both high strength and good sealability, the operator must use more expensive "pin nose" type connections that do not seal on the threads.

My force-vector analysis for flank-wedging mating threads having no root-crest contact, shows unit frictional resisting force: $F = f(P)(1/\sin T + 1/\sin C)/(1/\tan T + 1/\tan C)$ where: $f$ = coefficient of friction; $P$ = interface pressure; $T$ = tension flank angle; $C$ = compression flank angle. When $T = C$ then this equation reduces to $F = f P/\cos C$, the conventional formula found on pages 3-28 and 3-29 of Marks Standard Handbook For Mechanical Engineers 8th ed which is correct when dope is allowed to extrude easily from between the load bearing surfaces. Mark shows "sin" instead of "cos" because that angle is referenced 90 degrees from mine. Since both Sharp-V and 8Rd threads have flank angles of 60 degrees, their torque is proportional to $F = 2 f P$ when calculated in accord with conventional practice.

API Committee 5B evidently thought that if they allowed flanks of the Buttress form to wedge like the 8Rd form, that torque would be proportional to $F = 8.2 f P$, which is 4.4 times torque for the sharp-V or 8Rd form, and out of range for practical use. However, since API Buttress threads do not wedge, then $F = f P = 0.084 P$. API Bulletin 5C3 entitled FORMULAS AND CALCULATIONS FOR CASING, TUBING, DRILLPIPE AND LINEPIPE PROPERTIES" gives many formulas, but they do not give a formula for torque because their test results were so erratic. The reason why API 8Rd connections have erratic torque is because a first connection may have large root gaps that will prematurely extrude dope, resulting in high torque and leakage while the next one may have small root gaps and much lower torque. However, a well may have hundreds of threaded connections and only one leaking connection can result in disaster. Pattersons connection may have a more consistant torque than 8Rd but because he does not wedge flanks, end-play will cause it to loosen and leak when it is subjected to repeated service loads. For many years, thread experts all over the world have used API 8Rd, Buttress and Pattersons threads, but none have recognized features and advantages of the present invention.

The API Buttress thread form allows Dope to extrude through gaps between the flanks which allow 0.002" to 0.008" end play at full makeup. Even if the gaps are reduced to between 0.002 and 0.004" per U.S. Pat. No. 4,508,375 to Patterson, end play will still occur when external loadings are imposed to cause loosening, extrusion and leakage at some unknown time later. Patterson also evidently knew that wedging of his threads would cause extreme torque, as evidenced by his 0.002" minimum gap allowed between flanks that prevents wedging. Had the API committee or Patterson recognized advantages of the present invention, they could have solved their loosening, leakage and torque problems.

API Specification 5CT on Tubular Specifications states in paragraph 5.19(a), "Pipe test pressures shall be held for not less than five seconds" which tests the pipe wall strength but does not test thread sealability because, it may take more than an hour for pipe dope to extrude through the thread gaps to prove a leak whereas, the required service life is generally between five and fifty years. Therefore, many casing connections are now on the market claiming high strength, good sealability and/or reasonable torque, but they use a separate pin-nose seal in addition to threads for holding the pin-nose seal together, which increases susceptibility to damage and increases cost, which in turn, prohibits their use for most applications. The resulting failures of pipe connections in deep wells increases rework costs, energy loss, danger to the public and damage to the environment.

The manufacture and use of large diameter pipe connections present several problems not encountered with small connections. Handling damage is much more probable and much more costly. Reimert U.S. Patent No. 4,429,904 discloses a large diameter welded on connection having special form Buttress threads that neither wedge nor seal. The O-ring 76 and stop shoulder 73 are mounted with a welded-on tubular member of increased diameter and radial thickness, at a great increase in cost. A reliable connection formed within dimensions of the pipe wall would save time, energy, cost and the uncertainty of weld quality. Reimert also reduces torque by preventing wedging of the thread flanks as shown in FIG. 9, but at a very high price. He also provides a seal separate from the threads by means of an O-ring and a pin-nose, but a seal that will degrade with time and that is not retrievable with the pin to the surface of the ocean.

Many patents such as U.S. Pat. No. 2,094,492 to Janata and U.S. Pat. No. 2,196,966 to Hammer disclose high angle tension flanks to wedge in cooperation with low angle compression flanks so as to keep torque within useable range. However, low compression flank angles sacrifice compressive strength of the connection which tends to cause loosening and leakage if subjected to compressive or bending loads. Others such as Patterson have high flank angles for both tension and compression flanks but do not allow wedging of the flanks that is necessary to prevent loosening and leakage.

Therefore, industry is clearly in need of a threaded pipe connection having low torque, that stabs easily, that will seal reliably and does not loosen when service loads are imposed on it.

DISCLOSURE OF THE INVENTION

The present invention provides a tubular connection for joints of plain end pipe or the like, having a first tubular member formed with tapered external threads and a second tubular member formed with tapered internal threads for sealing cooperation with the external threads.

So as to avoid the pullout tendency inherent in a non-upset threaded pipe connection formed with conventional 60 degree thread flank angles with respect to the tubular axis, a thread form is provided that has a load bearing flank angle of at least 75 degrees with respect to the tubular axis, the optimum angle depending on such factors as the pipe diameter, the wall thickness and the material strength.

As taught by my series of patents beginning with U.S. Pat. No. 2,766,829 which have enjoyed worldwide commercial success for over 30 years in the oilfield, the space industry and the nuclear industry, the taper of the external thread may be formed at a lesser angle than the taper of the internal thread so as to ensure a maximum primary sealing tendency at the smallest pressure area so as to mimize the axial load imposed on the connection due to internal fluid pressure. The present invention may utilize this feature in combination with other features. With this feature, initial thread engagement occurs on the external thread at the small diameter end only, simultaneously as a radially spaced relationship exists between the internal and external threads elsewhere. As the connection is tightened toward full makeup, thread contact increases progressively from the small diameter end toward the large diameter end of the threads. The threads may be dimensioned such that at full makeup, the threads at the large diameter end are in contact also.

The use of flank angles that reduce pullout tendency also allows the use of a lesser thread depth than would be practical with the use of conventional 60 degree flanks. In turn, the lesser thread depth allows for a higher connection efficiency because a smaller portion of the pipe wall is removed to form the thread and thereby, a higher connection efficiency is possible for a flush or near-flush connection.

Machines to swage pipe sizes over 10" are very expensive and fewer large connections are threaded per run, so the cost usually prevents serious consideration of swaging large pipe connections. Yet the need for swaged connections several feet in diameter exists for such uses as on drive pipe, for pipe lines etc. Also a less expensive swaged pipe connection than is now available is needed in smaller sizes for some uses.

For these and other reasons, the present invention discloses a self-swaging connection having tapered mating threads of desired dimensions that can be formed on plain end pipe where upon make-up, the internally threaded box expands and the externally threaded pin contracts within predetermined limits, so as to provide a swaged connection of high efficiency. Before assembly of the connection, the threads are dimensioned such that: the box wall is thinner than the pin wall by a predetermined amount at the large end of thread engagement; the box wall is thicker than the pin wall by by a predetermined amount at the small diameter end of thread engagement; the box and pin walls are substantially equal in strength in a plane intermediate the large diameter end and the small diameter end.

Thread dimensions are selected such that upon full make-up of the connection: toward the large thread diameter end, the box wall will expand to predetermined dimensions; toward the small thread diameter end, the pin wall will contract to predetermined dimensions; the box wall will expand about the same amount that the pin wall contracts at the plane of equal strength; to thereby effect sealing engagement of the threads along their full length of engagement.

By way of example, the outer box diameter may be swaged larger than the original pipe outer diameter by an amount equal to twice the radial thread depth so as to effect a connection efficiency of approximately 90%, or by an amount equal to four times the radial thread depth to effect 100% efficiency. Within reasonable design parimeters, the ratio of plastic to elastic deformation effected will decrease with: thread depth decrease; pipe diameter increase; pipe material yield strength increase. In a connection of 100% efficiency, the pin face bore will contract about the same amount that the box face O.D. expands.

After assembly, the threads will lie along a generally steeper taper than the taper they were machined on. The threads must be dimensioned before their assembly such that when the box and pin are assembled to the hand-tight position, there is a predetermined number of turns from the position of full make-up so the angle of taper can effect the desired amount of swaging of the box and pin as they are tightened to a position of full make-up. The threads may be machined with a single taper or on various taper combinations without departing from the spirit of the present invention.

Such desired dimensions may effect: face widths of the box and pin sufficient to prevent premature jumpout of the threads when under axial loads; sufficient length of thread engagement to ensure a fluid seal; a cross section wall area at the last engaged thread of the box and of the pin to allow a selective connection efficiency between 50 and 100%. For services that can accept an efficiency less than 100%, the resulting bore through the connection can be increased by tightening the connection a lesser number of turns past the hand-tight position than is necessary for a 100% connection.

Such swaging will usually be mostly plastic and partially elastic. However, for large diameter pipes with thin walls and high yield strengths, the swage could be fully elastic. Per inch of diameter, all connections may have an elastic return equal to: the yield strength of the material divided by its modulas of elasticity. The remainder of the swage if any, will be in the plastic range and the pipe will not return.

Some services require pipe connections having higher bending and/or compression strengths than normal service, such as for use with drive pipe and marine risers used on offshore wells. To provide such strengths, the thread form stab flank angle of the present invention may be increased as required and also, the taper angle of the thread cone may be reduced to increase the length of engaged threads within existing diameter constraints. When the connection is provided with a pin shoulder that abuts the face of the box upon full makeup, that shoulder adds to the compression and bending strength of the connection.

Limiting lengths for the equal length crest or root of the present invention are: more than thirty-three but less than forty-seven percent of the axial pitch length. The forty-seven percent maximum length is necessary to allow included angles such as 14 degrees because if the crest and root length each, are equal to 50% of the axial pitch, the entire thread length would comprise crests and roots with virtually no flank length or radial width, that are necessary to support service loads.

The minimum included angle desired for the present invention is specified by my formula presented below, which is 13.4 degrees when API dope is used. The maximum desired included angle is four times the minimum, which when using API dope, is 4×13.4 or 53.6 degrees, unless restricted even further to a lesser angle by other considerations such as service load requirements as discussed elsewhere herein.

I believe the optimum thread depth for the present invention to substantially equal five-eights of the axial thread pitch, but a thread depth greater than fifth percent of the axial pitch length is dictated by geometry, to provide radial widths for the thread flanks so as to support service loads.

The present invention provides a high efficiency threaded connection for tubular members for easy assembly with the use of pipe dope at relatively low torque, that seals reliably between the mating threads and provides firm strength against repeated mechanical shock loadings without loosening, leaking or failure. A preferred embodiment is described below:

The connection has a pin and a box with mating threads for assembly with pipe dope and is formed with 83 degree compression flank angles and 83 degree tension flank angles, the tension and compression flanks being connected by crest and root formed with like radii positioned tangent with the flanks they connect, a radial thread depth equal to two-thirds of the axial thread pitch, box and pin thread forms being formed sufficiently complementary to each other such that no gaps wider than 0.006" may exist upon full makeup of the connection, but in no case is a gap allowed having an inscribed circle diameter greater than the quantity:0.33 L/psi, where L=inches of helical thread length; psi=service pressure.

I have discovered that API Dope will readily extrude through gaps greater than 0.006" because the solid particles are too small to be clamped by the thread surfaces, so they flow along the helix entrained in the grease. Such flow is in accord with the laws of Rheology and is therefore slow and will often give a short time indication of a seal. However, water pressure may days later, push out the dope and cause a leak. Gas pressure may channel through the dope in a matter of minutes. I have also found that threads having lesser gaps will clamp the particles and then extrude grease from between the particles while compressing those particles to a thickness range between 0.006 and 0.0007" depending on the specific interface pressure of a connection. Therefore it is now clear, that to reliably and permanently seal between mating threads with API dope, there must not be a gap greater than 0.006" and that simultaneously, the mating thread surfaces must not be required to compact solid particles to less than 0.0007" thickness in order to reduce larger gaps to 0.006".

API 8Rd and Buttress threads have erratic torque because they allow gaps greater and allow gaps less than 0.006". One such connection may extrude dope prematurely and the next may retain dope late enough during makeup such that torque is much less.

All during makeup of a connection of the preferred embodiment, the root gap will be approximately four times as great as the combined flank gaps and therefore, as makeup begins, the dope will slowly flow from between the flanks into the much larger root gaps leaving solid particles between the flanks as compared to fast helical flow along root gaps that tends to carry solid particles out of the connection. Shortly before reaching the position of full makeup, such flow will be slowed by reduction in size of the root gaps to less than 0.006" but will continue while exerting 93% of the radial fluid dope pressure against crests and roots and thereby hold flanks out of mating contact, as the widest flank gap is reduced toward 0.0007", makeup being finally stopped by compression of solid particles to a thickness sufficient to firmly support and seal between wedged mating flanks. If the axis is positioned vertically during assembly, the mating compression flanks may be held in contact during makeup by weight of the pin member which may wipe them substantially clear of solid particles, but a layer of solid particles toward 0.0007" thick for example, may trap between tension flanks and such as a 0.003" layer may be trapped in root gaps, as dictated by geometry of the included angle and the precisely complementary forms of mating threads. Should the axis be positioned horizontally during makeup, then a 0.0007" layer of solid particles may be trapped between all flanks in which case, the layer of dope that is trapped in root gaps may be toward 0.006". In either case, the solid particles can not flow from between the mating threads after makeup because they are squeezed all along the helical length of the root gaps and are held held in there against fluid pressure. Likewise, no end play can occur between the box and pin because the solid particles are packed firmly to a thickness sufficient to support loads between wedged mating flanks.

No thread wedging can occur during makeup because crests and roots comprise 93% of the axial thread length and they ride against solid lubricants, holding flanks out of wedging contact with each other. Near the final stage of makeup, solid particles are compressed in the root gaps to a thickness between 0.006" and 0.003" as the high angle flanks compress particles toward a 0.0007" thickness. Immediately before wedging of flanks at full makeup position, F=0.021 P which is surprisingly lower than "F" values for 8Rd and Buttress above. Then, after wedging, F=f P/cos(83)=0.172 P Makeup progressively reduces the gaps, increasing pressure on the dope which slowly squeezes grease from the small flank gaps to the much larger root gaps and thence along the thread helix. Only at full makeup will the flanks wedge with solid particles therebetween to desirably signal full makeup position by an abrupt increase in torque, without use of a torque shoulder. This feature is of great advantage for an integral connection cut on non-upset pipe, where no shoulder can be formed thereon without removal of some of the pipe wall that greatly reduces connection efficiency.

Although I believe the 83 degree flank angles of the preferred embodiment to be good for general use when using API dope, other combinations of flank angles having a fourteen degree included angle may be of advantage for certain uses. For instance, if a compression flank angle of 90 degrees is desired for a particular service, then a tension flank angle of 76 degrees in combination, would effect similar torque and sealability, when using API Dope. Should other dope formulations be desirable for specific uses, then the minimum theoretical included angle may be approximated by use of my formula as follows:

$$\text{Angle} = 2 \times \arcsin \left[ \frac{\text{min thickness that dope will compact}}{\text{max gap that dope will seal}} \right]$$

The minimum theoretical included angle calculated by this formula for threads for use with dope formulated in accord with API 5A2 1982, equals 13.4 degrees. To allow for a reasonable angle tolerance, I chose 14 degrees for the preferred embodiment which results in a reliable high pressure gas seal and a torque of approximately ⅛ that for conventional threads such as 8Rd, were they formed with the same included angle. Selection of an angle just greater than 13.4 provides maximum strength against axial loads. The torque advantage of the preferred embodiment over conventional threads reduces as the included angle increases to 60 degrees. It should be understood that neither API Buttress nor Pattersons thread can effect such favorable characteristics because flanks do not wedge to prevent relative motion between the box and pin which allows their loosening and leakage.

So as to hold mating threads of the present invention in firm mutual contact during service against relative movement that may be urged by service loads, the box and pin should be dimensioned sufficiently to induce preloaded circumferential stresses in the box and pin that are greater than any such stresses that could be induced by any combination of loads within rated capacity. The 83 degree flank angles help to meet this need as explained earlier, without the use of "hook"

threads having negative flank angles to reduce pullout tendency. Such hook threads present many problems in their manufacture and quality control, that result in poor sealing reliability and excessive costs.

BRIEF DESCRIPTION OF THE DRAWINGS

FIG. 5. depicts a fragmentary section of a connection in accord with the present invention, when hand-tight.

FIG. 6. depicts the connection of FIG. 5, at a make-up position to effect a high efficiency connection.

FIG. 7. depicts the connection of FIG. 5, at a make-up position to effect a full strength connection.

DETAILED DESCRIPTION OF THE INVENTION

Figure 1:
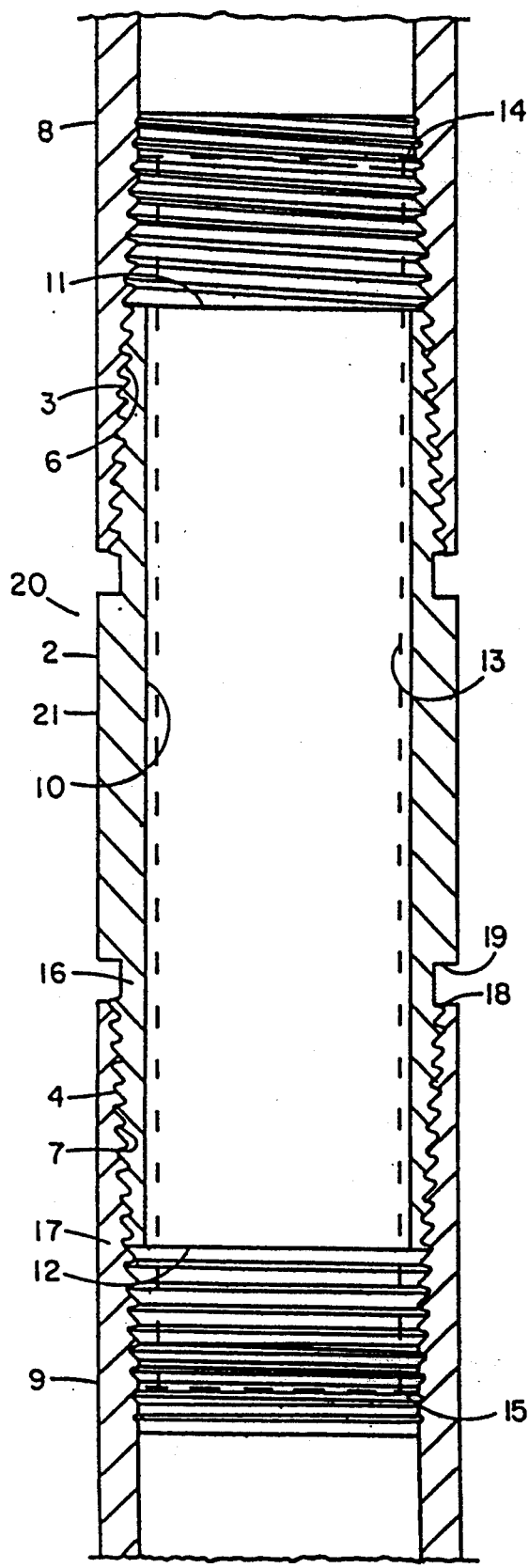
FIG. 1. depicts a vertical; section of a connector in accord with the present invention.

FIG. 1 depicts tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of non-upset tubing 8 and 9 respectively, to be connected.

Coupling 2 may comprise inner diameter 10, upper end surface 11 and lower end surface 12, said end surfaces not extending for the full length of internal threads 6 and 7. Such a connection, as limited by the tension area resulting between the root diameter of the last engaged thread as at 12, and the tubing outer diameter, may provide an axial tension strength in excess of three fourths of the pipe wall strength, effecting an efficiency greater than 75%.

Should a connection of higher strength be required, coupling 2 may be formed with inner diameter as at 13, upper end surface as at 14 and lower end surface as at 15. The coupling thereby extending for substantially the full effective length of the internal threads so as to provide a connection having an axial strength substantially equal to the pipe wall strength to thereby approach 100% efficiency.

Figure 3:
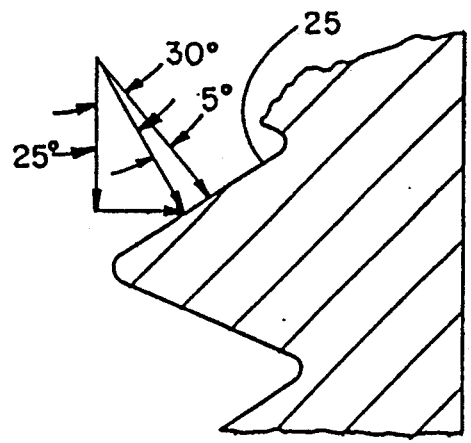
FIG. 3. illustrates a thread form in accord with conventional connections.
Figure 2:
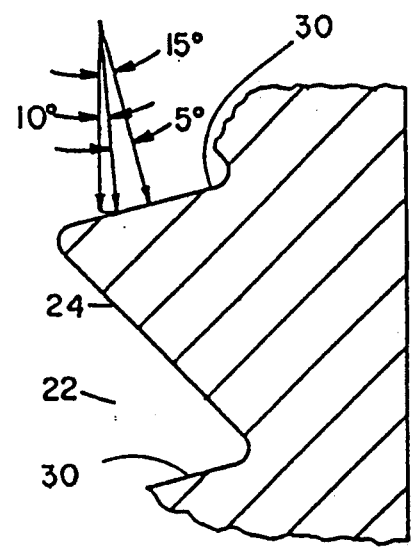
FIG. 2. illustrates a thread form in accord with the present invention.

Since typical tubing joints have lengths of sixty times or more the lengths of couplings that connect them, the couplings may be formed of material much stronger than the material the joints are formed of without causing significant increase of cost for the entire string. The use of higher strength material for the coupling 2 provides a higher axial strength for the connection 20 because, the strength of the coupling at neck section 16 is increased and because, collapse resistance of the pipe end as at 12 is increased to thereby increase the pullout strength also. To further increase the pullout strength of the connection, a thread form having a load bearing flank 30 formed at 75 degrees with respect to the tubing axes as depicted in FIG. 2, may be used for the mating threads as opposed to the most common thread form used on oilwell tubulars, depicted in FIG. 3. The form of FIG. 3 has a load bearing flank 25 which effects an angle of 60 degrees with the tubing axis. Assuming an angle of friction of 5 degrees, elementary vector analysis will show that the form depicted in FIG. 2 results in a pullout strength 2½ times that of FIG. 3. Reduction of the flank angle still further, can virtually elimimate tendency to pullout.

So as to ensure a seal diameter for the connection of least diameter and therefore the least axial fluid load, the taper of the external thread may be made slightly less than the taper of the internal thread. Such a condition also allows maximum radial compression of the coupling as at end surface 12 adjacent pipe wall as at 17 which may be formed thicker than the adjacent coupling wall. Thus, upon makeup, end 12 will compress more than wall 17 expands due to the difference in thickness, the moduli of elasticity being considered substantially the same. Since coupling 2 may be made of higher strength material than tubing joints 8 or 9, the thickness may be dimensioned such that stresses in walls at 12 and 17 are more nearly at the same percentage of the yield strength of the materials of which the members are formed.

When the taper of the external thread is made less than the taper of the internal thread, initial contact between the two occurs only at the small end as at 12 with the internal thread as at 17. Upon continued makeup, thread contact progresses toward the larger end of the tapers to cause full engagement of the threads as at 18. A slight amount of further makeup may cause a predetermined magnitude of circumferential stress within the end of the tubing joint as at 18 and thereby establish a position of full makeup, so as to cause: compressive circumferential stresses within end 12 to be at a first desired value, simultaneously with tension circumferential stresses within the tubing joint wall between 17 and 18 being at a second desired value, less in magnitude than said first value. Said values may be set at the same percentage of the unit yield strengths of the respective materials to thereby effect a maximum strength for the connection.

Connection 20 may comprise shoulder 18 formed on the end of joint 9 and shoulder 19 formed on coupling 2 intermediate thread 4 and the outer diameter 21 of coupling 2. The mating threads may be dimensioned so as to makeup as shown in FIG. 1 or should greater bending and compression strength or greater tortional strength be desired, the mating threads may be dimensioned and given closer tolerances so as to allow shoulders 18 and 19 to abut upon makeup.

Figure 4:
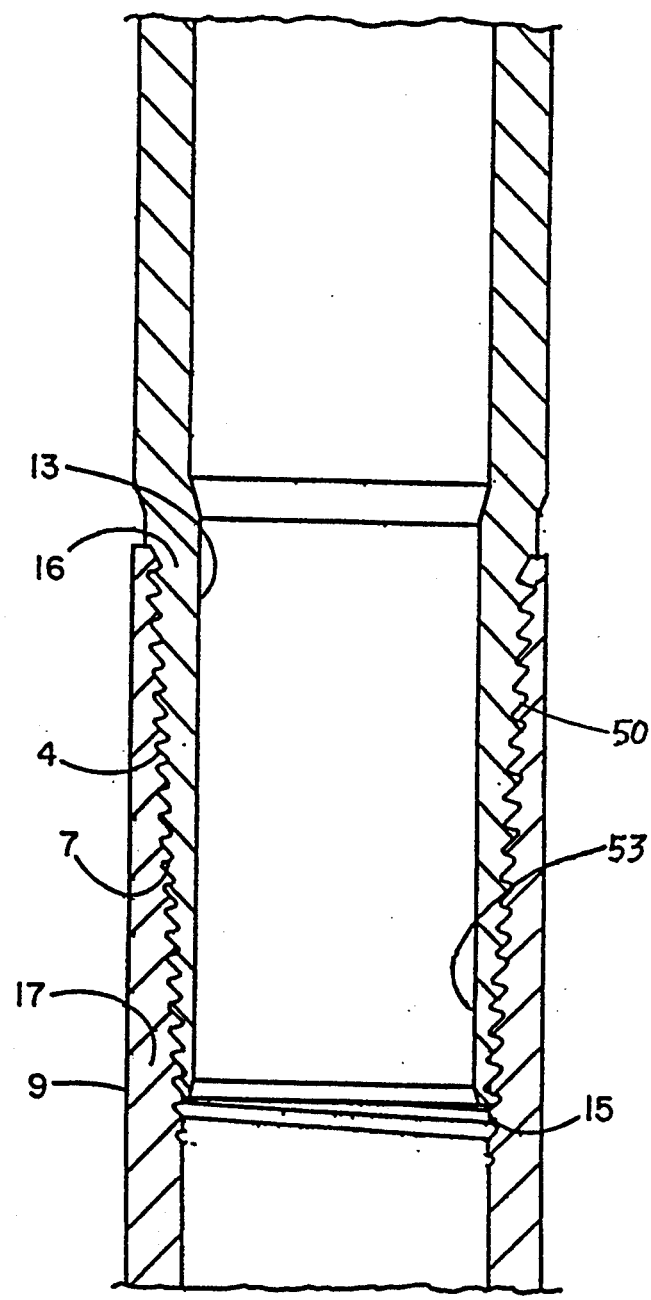
FIG. 4. depicts an embodiment of the present invention that provides shoulder abutment upon makeup.

FIG. 4 depicts a preferred bore configuration for the pin end which can include minimum bore diameter extending to the pin neck as at 13 and an outwardly tapering bore extending therefrom to the pin end as at 53 which is sufficiently larger than bore 13 so as not to restrict bore 13 upon contraction of bore 53 upon makeup of the connection. This preferred pin configuration may be formed on each end of a coupling and it may also be formed on the end of a pipe joint that has been swaged-down so as to provide for bore 13 being smaller than the nominal pipe bore.

FIG. 5 depicts a self-swaging tubular connection of the present invention in the hand-tight position, comprising pipe joint 60 formed with tapered pin thread 62 and pipe joint 61 having tapered box thread 63 formed for sealing cooperation with pin thread 62 as later described. Box thread root diameter 64 at box face 65 is preferably dimensioned such that the radial width 67 of face 65 is not less than radial thread depth 68 positioned between root diameter 64 and box thread crest diameter 69 to prevent premature "jump-out" of the threads under tensil loading. Likewise, it is preferred that radial width 70 of pin face 71 not be less than depth 68 for the same reason. Box thread taper 72 should be slow enough to provide a sufficient length of box thread 63 to prevent thread jumpout, in cooperation with the thread load flank angle depicted in FIG. 2.

If the root diameter of the pin thread extends substantially to the outer diameter of the pipe as at 73 as is well known in the manufacture of collar type connections, and if the root diameter of the box thread extends to the bore of the pipe as at 74 taught by my U.S. Pat. No. 4,813,717 in the line of priority for the present application, then a high strength self-swaging connection is now apparent.

For services where a full-strength connection is not required and a maximum bore is desired, the connection may be made-up as depicted in FIG. 6. Upon such make-up, box wall 74 toward the large diameter end of thread engagement at face 65, is thinner than adjacent pin wall 75 and therefore, box wall 74 is swaged outwardly by pin wall 75 to a predetermined outer box diameter 79. Likewise, pin wall 76 toward the small diameter end of thread engagement at face 71, is thinner than adjacent box wall 77 and pin wall 76 is swaged in by box wall 77 to bore dimension 78 predetermined by both the box and pin thread dimensions and the make-up position. At plane of equal strength 80, axially positioned intermediate faces 65 and 71, the outwardly swaging of box wall portion 81 is substantially equally to the inwardly swaging of pin wall 82. Because both the box and pin wall are stressed triaxially when under tension, it is an important feature of the present invention that the degree of swaging in both walls decreases as the axial load transfers from the mating thread. In further explanation, wall 74 has received a greater degree of swaging and therefore more tangential stress than wall 77 but does not carry as much axial stress. Conversely, wall 77 can carry a higher axial stress because it does not carry as much tangential stress.

For services where a full strength connection is required and a smaller bore is acceptable, the connection may be made up as depicted in FIG. 7 whereupon, box outer diameter 90 has been swaged larger than diameter 79 and bore 91 has been swaged smaller than bore 78. It is now apparent that pin wall 92 at the last engaged pin thread and box wall 93 at the last engaged box thread are substantially the same as the nominal pipe wall 94 to thereby effect a full-strength connection.

As taught by the above identified patent, the use of thread forms having minimum thread depths and high load flank angles, with respect to the tubular axis, facilitates the functions of clearance and efficiency for flush and near-flush connections. Such features may be used in combination with the present invention to add new features such as, reducing the degree of swaging required to attain a desired face width.

Upon review of these disclosures, it is now apparent that an integral, full strength swaged connection can be formed with plain end pipe without need for upsetting or swaging prior to threading of the pipe ends. The portion of the swage that is elastic equals the pipe diameter multiplied by the yield stress, divided by the modulas of elasticity. The rest of the swage is plastic. The present invention may be used for a wide range of services and it may be desirable to vary the amount of makeup to suit each service. One API standard allows for 3% cold work of tubular goods, with regard to cold swaging before threading, so that may be a practical limit of this connection for such API services. An example within such a limit is as follows: A 30 O.D. pipe with a 1" wall and a radial thread depth of 0.133" requires a full strength connection; $4 \times 0.133 = 0.532"$ = the amount of swage required; $0.532/30 = 0.0177$ which is 1.77%; since 1.77% is less than 3% then the connection would be acceptable.

Many tubular connections have only half as much strength under axial compression loads as they have under axial tension loads. A connection that is derated in compression will have approximately that same derating in bending. So as to adapt a connection in accord with the present invention to any desired compression rating up to 100%, the stab flank angle (24) depicted in FIG. 2 may be adjusted as required without departing from the spirit of the present invention.

The thread form depicted in FIG. 2 may be used with the present invention wherein angle 22 formed between load flank 30 and stab flank 24 is at least twice the angle of friction between the box and pin materials, so as to prevent lockup of the box and pin threads with each other due to the high interface pressures generated by the radial forces necessary to swage the connection during makeup.

FIGS. 8–11 depict a fragmentary section of a preferred embodiment of the thread form of the present invention through four stages of makeup, enlarged from a connection as at 50 in FIG. 4. However, it should be understood that these features may be used to advantage with other threaded connections without departing from the spirit of my invention.

Figure 8:
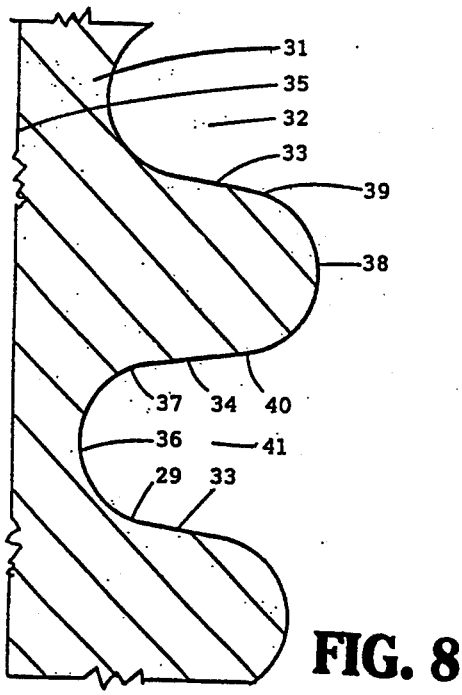
FIG. 8. depicts a fragmentary section taken from FIG. 4 of a pin thread of the present invention.

Pin member 31 formed with tapered pin threads shown generally in FIG. 8 at 32 comprise: tension flanks 33 and compression flanks 34 formed at 83 degrees relative to tubular axis 35; root 36 formed with a radius tangent to flanks 33 and 34 as at 29 and 37 respectively; crest 38 formed with a radius of equal dimension to the root radius, tangent to flanks 33 and 34 as at 39 and 40 respectively; included angle 41 dimensioned as fourteen degrees between the surfaces of flanks 33 and 34.

Figure 9:
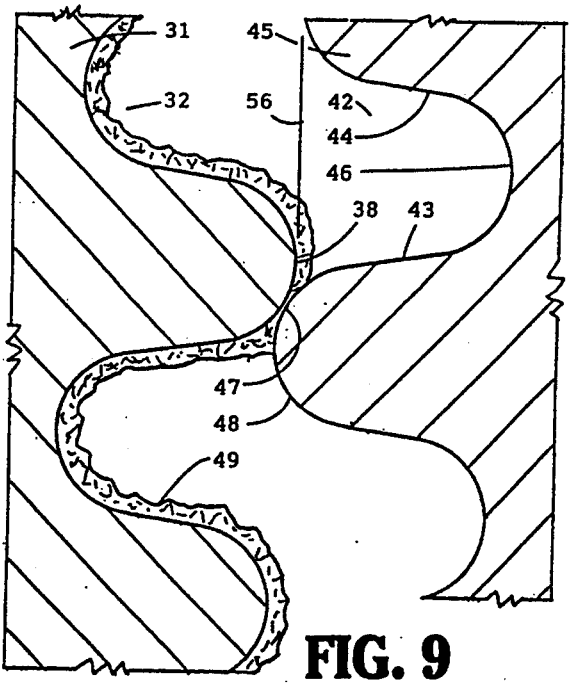
FIG. 9. depicts the pin thread of FIG. 8 upon initial contact with the mating box thread.

FIG. 9 depicts first contact of tapered pin threads 32 with tapered box threads 42, formed complementary to pin threads 32 with no intended root gaps. After pin member 31 has been axially positioned vertically without rotation into box member 45 such that crests 38 will pass box thread crests 48 as along vertical line 56 no further but will make circumferential contact with crest 48 as at 47, it will thereby establish "stab position" of the connection whereafter, weight of the pin member will serve to maintain contact between the mating threads during makeup of the connection. Box threads 42 also comprise tension flanks 44 and compression flanks 43 connected by roots and crests 46 and 48 respectively. A coating of API thread dope 49 is shown on pin threads 32 so as to lubricate between the threads during makeup and to seal between them as the threads become fully engaged.

Figure 10:
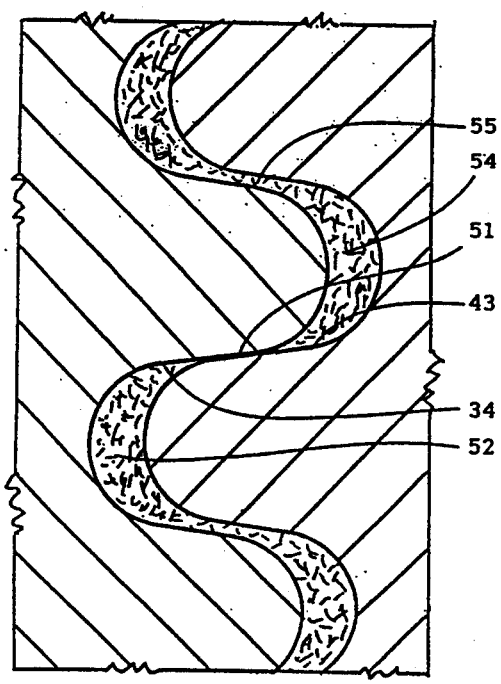
FIG. 10. depicts the box and pin threads of FIG. 8 when partially made up.

FIG. 10 depicts the threads at an intermediate stage of makeup whereupon: pin thread flank 34 has gained an increased area of contact as at 51 with box thread flank 43, the flanks having slid along each other in response to rotation of the tapered pin threads into the tapered box threads; dope having been slowly squeezed radially from between flanks as at 55, to the pin root gap as at 52 and toward the box root gap as at 54, the slow flow allowing retention of solid particles between flanks 33 and 34 as dope flows helically along root gaps 52 and 54. As makeup continues, some of the solid particles are carried along root gaps until gaps 52 and 54 are reduced toward 0.006" after which, the flow slows due to a buildup of back-pressure as solid particles are then increasingly gripped between the roots and crests. While grease flows momentarily around the particles just before full makeup, the particles are firmly compacted as in FIG. 11 to seal the gaps. It should be noted that gap 55 between flanks 33 and 44 is less than one-fourth the width of the root gaps at any stage of makeup, dictated by the 14 degree included angle and complementary thread form.

Figure 11:
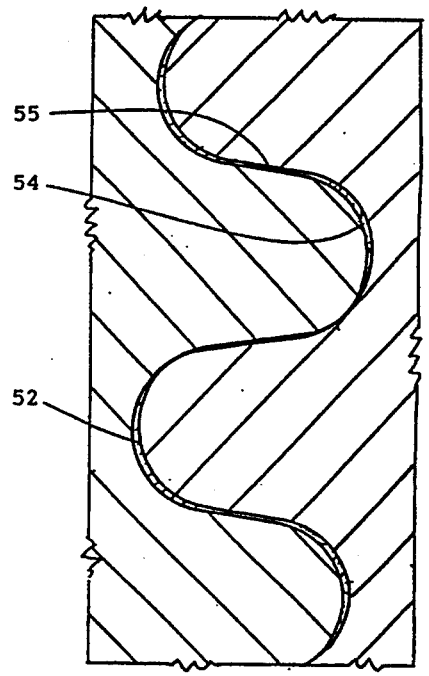
FIG. 11. depicts fully made up threads of the present invention.

FIG. 11 depicts the position of full makeup of threads in accord with the preferred embodiment with the axis positioned vertically whereupon: the extremely high mechanical advantage afforded by 83 degree flank angles has compressed solid particles to thicknesses toward 0.0007" in gap 55 to support high end loads and to 0.003" in gaps 52 and 54 to seal against extremely high fluid pressures. Since the mating threads are formed complementary to each other without large root gaps such as allowed for 8Rd threads, the ratio of root-gaps/flank-gaps will be essentially constant at 4.1 such that reasonable variations in formulation of the dope may slightly affect final dimensions of the gaps, but will not substantially affect strength, torque nor sealability.

Should the axis of the present invention be positioned horizontally during assembly, then toward a 0.0007" thick layer of solid particles may be trapped between both compression and tension mating flanks at full makeup of the connection whereupon, the root gaps may compress solid particles to a thickness such as 0.006" to seal high fluid pressures when a sufficient helical length of threads exist and the threads are held in best mating contact against all service loads.

In comparison to the present invention, even if API 8Rd threads had no intended root gap, their flank gap would equal the root gap when assembled horizontally and would be twice the root gap when assembled vertically. Such a large flank gap during makeup allows a high rate of helical flow of dope from between the flanks which reduces retention of solid particles that are needed for best lubrication between the flanks. Even at full makeup with the 8Rd flanks wedged, the root gaps may be as large as 0.011" which allows a continued rheological flow of dope out of the connection to cause leakage, because the dope cannot permanently seal such a gap. This explains one reason why 8Rd threads cannot be expected to hold high pressures, and the 60 degree flank angles allow mechanical loosening of the connection upon the application of mechanical loads.

My thread form may be combined with features presented earlier in the specification so as to provide low-torque threaded connections for non-upset pipe joints with efficiencies as high as 100%, that do not loosen or leak even when heavy shock loadings are imposed, as may occur when they are used for drive-pipe.

Thus, it is now clear that the present invention provides a thread form for high strength tubular connections that: will not loosen in response to external loads; that will effect a reliable long life seal between the threads; that can be easily assembled and madeup with relatively low torque.

Although this low-torque, high-strength, reliable-sealing thread form is of greatest advantage when used for drive-pipe, it may also be used to advantage on connections depicted in FIGS. 1, 4, 5, 6, 7, and others that may need such advantage.

I claim:

1. A threaded pipe connection for assembly with the use of pipe dope, the connection having box and pin members formed with mating pipe threads, the threads being formed with tension and compression flanks connected by crests and roots, the mating threads having an included angle between the flanks, comprising: the pipe dope being a desired mixture of grease and solid particles suitable to lubricate and seal between the mating threads; a thickness of first dimension below which, the solid particles will not compress between the mating threads; a thickness of second dimension above which, the solid particles will not seal between the mating threads; the mating threads being dimensioned and formed sufficiently complementary to each other such that at a position of full makeup of the connection, a compacted solid particle thickness of first dimension beyond which the particles will not compress is wedged between mating flanks simultaneously as a compacted solid particle thickness of third dimension intermediate in value to the first and the second dimensions, exists between the mating roots and crests, the third dimension being measured along a bisector of the included angle.

2. The connection of claim 1 further comprising: the connection strength being selectively adjustable between fifty percent and one hundred percent of the full pipe wall strength by making the box and pin up to a selected position intermediate the hand tight position and the position of full makeup, so as to effect a larger bore diameter and a smaller box outer diameter, than would exist if the connection was tightened to the position of full makeup.

3. A threaded pipe connection having a box and pin formed with tapered mating threads for assembly with the use of pipe dope to lubricate and seal between the threads, the threads having a radial thread depth and an axial pitch length, the threads being formed with mating tension and compression flanks that are connected by crests and roots, the threads having an included angle measured in the gap between the flanks, comprising: the threads being dimensioned such that upon assembly of the connection, both tension and compression flanks are loaded against their mating flanks; the included angle being less than fifty-four degrees; the radial thread depth being more than fifty percent of the axial pitch length; the axial length of the crest being within the range of thirty-three to forty-six and one-half percent of the axial pitch length.

4. The connection of claim 3, further comprising: at least one of the flanks being positioned at a flank angle greater than sixty degrees with respect to the tubular axis.

5. The connection of claim 3 further comprising: a tension flank angle of seventy-two degrees; a compression flank angle of eighty-seven degrees.

6. The connection of claim 3 further comprising: the box threads being formed along a taper on non-upset pipe and the mating pin threads being formed along a taper on non-upset pipe of like diameter; a length of thread engagement extending sufficiently toward the bore of the box and toward the pin outer diameter; such that at the minimum diameter of thread engagement, the box wall strength is at least three-fourths of the pipe wall strength; such that at the maximum diameter of engagement, the pin wall strength is at least three-fourths of the pipe wall strength.

7. The connection of claim 1, further comprising: the pin threads being formed with a taper having a first included angle; the box threads being formed with a taper having a second included angle; the first included angle being less than the second.

8. The connection of claim 1 or 3, further comprising: the crest and the root being formed by radii of equal dimension.

9. The connection of claim 1 or 3, further comprising: the radial depth of the thread being substantially equal to two-thirds of the axial thread pitch.

10. The connection of claim 1 or 3, further comprising: the pin threads being formed generally along a conical taper; the box threads being formed generally along a conical taper; the threads having a desired length of thread engagement; the mating threads being dimensioned such that the pin can be positioned into the box, a distance of at least one-half of the length of thread engagement without need for rotation of one member with respect to the other member.

11. The connection of claim 1 or 3, further comprising: a tension flank angle of eighty-two degrees; a compression flank angle of eighty-four degrees; a radial thread depth equal to two-thirds of the axial thread pitch; the crest and the root being formed with radii of equal dimension, the radii being positioned tangent to the respective flanks that they connect.

12. The connection of claim 1 or 3, further comprising: tension and compression flank angles of eighty-three degrees each; a radial thread depth equal to two-thirds of the axial thread pitch; the crest and the root being formed with radii of equal dimension; the radii being positioned tangent to the respective flanks that they connect.

13. The connection of 1 or 3 further comprising: the mating threads being formed complementary to each other such that when they are placed in dry mating contact, no gaps wider than the first dimension will exist between the mating surfaces.

14. The connection of claim 13 further comprising: the thread form having a surface profile tolerance no greater than the thickness of first dimension.

15. The connection of claim 1 or 3, further comprising: the minimum included angle being not less than twice the arcsin of the quantity, the first dimension divided by the second dimension; the maximum included angle being not more than four times the minimum included angle.

16. The connection of claim 1 or 3 further comprising: the mating threads being formed sufficiently complementary to each other such that when the threads are placed in dry mating contact, no gap exists between the threads that exceeds one third of the quantity; the helical length of the mating threads measured in inches, divided by the service pressure measured in pounds per square inch.

17. The connection of claim 1 or 3, further comprising: the pipe dope being formulated in accord substantially with API Standard 5A2; the included angle being substantially fourteen degrees.

18. The connection of claim 1 or 3, further comprising: the axial crest length being thirty-six percent of the axial pitch length.

19. The connection of claim 3, further comprising: the connection strength approaching the full pipe wall strength.

* * * * *